(12) United States Patent
Tan et al.

(10) Patent No.: US 11,106,074 B2
(45) Date of Patent: Aug. 31, 2021

(54) DISPLAY PANEL AND DISPLAY DEVICE

(71) Applicant: BOE TECHNOLOGY GROUP CO., LTD., Beijing (CN)

(72) Inventors: Jifeng Tan, Beijing (CN); Wei Wang, Beijing (CN); Wenqing Zhao, Beijing (CN); Xiandong Meng, Beijing (CN); Xianqin Meng, Beijing (CN); Fangzhou Wang, Beijing (CN); Jian Gao, Beijing (CN); Pengxia Liang, Beijing (CN); Xiaochuan Chen, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/645,515

(22) PCT Filed: Aug. 8, 2019

(86) PCT No.: PCT/CN2019/099701
§ 371 (c)(1),
(2) Date: Mar. 9, 2020

(87) PCT Pub. No.: WO2020/030021
PCT Pub. Date: Feb. 13, 2020

(65) Prior Publication Data
US 2020/0278576 A1    Sep. 3, 2020

(30) Foreign Application Priority Data

Aug. 8, 2018 (CN) .......................... 201810897823.7

(51) Int. Cl.
*G02F 1/1335* (2006.01)
*F21V 8/00* (2006.01)
(Continued)

(52) U.S. Cl.
CPC ..... *G02F 1/133512* (2013.01); *G02B 6/0016* (2013.01); *G02F 1/133602* (2013.01); *G02F 1/133615* (2013.01); *G02F 1/134309* (2013.01)

(58) Field of Classification Search
None
See application file for complete search history.

(56) References Cited

U.S. PATENT DOCUMENTS 10,750,145 B1 *   8/2020   Shipton .............. G02B 27/4272
2002/0167619 A1   11/2002  Bietsch et al.
(Continued)

FOREIGN PATENT DOCUMENTS

CN    101479797    7/2009
CN    103576399    2/2014
(Continued)

OTHER PUBLICATIONS

English translation of CN-106154657-A, Title: 3D display device and preparation method thereof, Author: Chen Cui; Zhang Yi; Jia Pingping; Xie Taofeng; Ding Xianlin; Ma Weijie; Date of publication: Nov. 23, 2016 (Year: 2016).*
(Continued)

*Primary Examiner* — Shan Liu
(74) *Attorney, Agent, or Firm* — Calfee, Halter & Griswold LLP

(57) ABSTRACT

The present disclosure provides a display panel and a display device. The display panel includes a base substrate and light-shielding strips. The base substrate includes light-shielding regions and light-transmitting regions. The display panel further includes a backlight module including a light guide plate and light extraction gratings. The display panel further includes a first electrode layer, a second electrode layer, and a liquid crystal layer. The first and second elec-
(Continued)

trode layers are configured to, in response to a control signal, control the liquid crystal layer to forms a plurality of liquid crystal grating periods. The liquid crystal within each of the plurality of liquid crystal grating periods includes a plurality of segments with different refractive indices, and the refractive indices of the plurality of segments progressively increase in a direction perpendicular to an extending direction of the first electrodes in the first electrode layer.

19 Claims, 4 Drawing Sheets

(51) Int. Cl.
*G02F 1/13357* (2006.01)
*G02F 1/1343* (2006.01)

(56) References Cited

U.S. PATENT DOCUMENTS

| | | | |
|---|---|---|---|
| 2009/0110011 A1 | 4/2009 | Nishikawa | |
| 2014/0055692 A1* | 2/2014 | Kroll | G03H 1/02 349/15 |
| 2015/0248031 A1* | 9/2015 | Kanbayashi | G02F 1/134363 349/33 |
| 2016/0018582 A1* | 1/2016 | Fiorentino | G02B 6/002 362/609 |
| 2016/0266465 A1 | 9/2016 | Rastegar | |
| 2017/0048515 A1* | 2/2017 | Imai | G02F 1/133512 |
| 2018/0088438 A1 | 3/2018 | Wang | |
| 2018/0143447 A1 | 5/2018 | Gao | |
| 2018/0199030 A1* | 7/2018 | Smith | H04N 13/366 |
| 2019/0086732 A1 | 3/2019 | Wang | |
| 2019/0101788 A1 | 4/2019 | Zhao | |
| 2019/0101797 A1 | 4/2019 | Wang | |
| 2019/0121171 A1 | 4/2019 | Tan | |
| 2019/0204691 A1 | 7/2019 | Tan | |
| 2020/0301165 A1* | 9/2020 | Fattal | G02B 27/42 |

FOREIGN PATENT DOCUMENTS

| | | | |
|---|---|---|---|
| CN | 203688918 | 7/2014 | |
| CN | 105589256 | 5/2016 | |
| CN | 105589269 | 5/2016 | |
| CN | 106154657 A | * 11/2016 | G02B 30/27 |
| CN | 106647093 | 5/2017 | |
| CN | 106959520 | 7/2017 | |
| CN | 107238974 | 10/2017 | |
| CN | 107367883 | 11/2017 | |
| CN | 107450211 | 12/2017 | |
| CN | 107632448 | 1/2018 | |
| CN | 108051961 | 5/2018 | |
| CN | 109031757 | 12/2018 | |

OTHER PUBLICATIONS

Office action from Chinese Application No. 201810897823.7 dated Apr. 23, 2020.
International Search Report from PCT/CN2019/099701 dated Oct. 23, 2019.
Office action from Chinese Application No. 201810897823.7 dated Jun. 23, 2021.

* cited by examiner

DISPLAY PANEL AND DISPLAY DEVICE

RELATED APPLICATIONS

The present application is a 35 U.S.C. 371 national stage application of PCT International Application No. PCT/CN2019/099701, filed on Aug. 8, 2019, which claims priority to Chinese Patent Application No. 201810897823.7, filed on Aug. 8, 2018, the entire contents of which are incorporated herein by reference.

TECHNICAL FIELD

The present application relates to the field of display technology, and in particular, to a display panel and a display device.

BACKGROUND

Common liquid crystal display (LCD) panels that do not require polarizers make the liquid crystal layer exhibit an effect of a liquid crystal grating by applying electrical signals to the liquid crystal layer. However, the common LCD panels have a limited diffractive capability, such that only a small part of light can be diffracted out of the panel. Such LCD panels have low light output efficiency, limiting the application of the LCD panels in some specific scenarios such as transparent display.

SUMMARY

According to an embodiment of the present disclosure, there is provided a display panel. The display panel comprises a base substrate and a plurality of light-shielding strips on the base substrate, wherein the base substrate comprises a plurality of light-shielding regions defined by the plurality of light-shielding strips and light-transmitting regions beside the plurality of light-shielding regions; a backlight module comprising a light guide plate and light extraction gratings, wherein the light extraction gratings are configured to couple out light in the light guide plate; and a first electrode layer, a second electrode layer, and a liquid crystal layer between the base substrate and the light guide plate, wherein the first electrode layer comprises a plurality of first electrodes spaced apart from each other, and the second electrode layer comprises a plurality of second electrodes spaced apart from each other. The first electrode layer and the second electrode layer are configured to control the liquid crystal layer in response to a control signal, such that the liquid crystal layer forms a plurality of liquid crystal grating periods, wherein a liquid crystal within each of the plurality of liquid crystal grating periods comprises a plurality of segments with different refractive indices, and the refractive indices of the plurality of segments progressively increase in a direction perpendicular to an extending direction of the plurality of first electrodes.

In some embodiments, the first electrode layer and the second electrode layer are at a same side of the liquid crystal layer and are electrically insulated, orthographic projections of the plurality of first electrodes on the backlight module do not overlap with orthographic projections of the plurality of second electrodes on the backlight module, and each of the plurality of first electrodes is configured to control the refractive indices of two of the plurality of segments.

In some embodiments, one of the plurality of liquid crystal grating periods corresponds to M electrodes comprising multiple ones of the plurality of first electrodes and multiple ones of the plurality of second electrodes, the M electrodes form M orthographic projections on the backlight module. The multiple ones of the plurality of first electrodes and the multiple ones of the plurality of second electrodes are in different layers, and orthographic projections of the multiple ones of the plurality of first electrodes on the backlight module do not overlap with orthographic projections of the multiple ones of the plurality of second electrodes on the backlight module. In response to the control signal, among the M electrodes, a voltage difference between an electrode corresponding to an (n−1)-th one of the M orthographic projections and an electrode corresponding to an n-th one of the M orthographic projections is smaller than a voltage difference between the electrode corresponding to the n-th one of the M orthographic projections and an electrode corresponding to an (n+1)-th one of the M orthographic projections, wherein M is a positive integer greater than or equal to 3, n is a positive integer greater than or equal to 2, and M is greater than n.

In some embodiments, both of the first electrode layer and the second electrode layer are formed on a side of the liquid crystal layer closer to the base substrate, or both of the first electrode layer and the second electrode layer are formed on a side of the liquid crystal layer closer to the backlight module.

In some embodiments, the first electrode layer and the second electrode layer are on different sides of the liquid crystal layer, an orthographic projection of each of the plurality of first electrodes on the backlight module overlaps with an orthographic projection of a corresponding one of the plurality of second electrodes on the backlight module, and each of the plurality of first electrodes is configured to control the refractive index of a corresponding one of the plurality of segments.

In some embodiments, one of the plurality of liquid crystal grating periods corresponds to J ones of the plurality of first electrodes, and in response to the control signal, a voltage difference between a k-th one of the J ones of the plurality of first electrodes and a second electrode corresponding to the k-th one of the J ones of the plurality of first electrodes is smaller than a voltage difference between a (k+1)-th one of the J ones of the plurality of first electrodes and a second electrode corresponding to the (k+1)-th one of the J ones of the plurality of first electrodes, wherein J is a positive integer greater than or equal to 2, k is a positive integer greater than or equal to 1, and J is greater than k.

In some embodiments, the first electrode layer is formed on a side of the liquid crystal layer closer to the base substrate and the second electrode layer is formed on a side of the liquid crystal layer closer to the backlight module, or the second electrode layer is formed on a side of the liquid crystal layer closer to the base substrate and the first electrode layer is formed on a side of the liquid crystal layer closer to the backlight module.

In some embodiments, the first electrodes and the second electrodes are strip-shaped electrodes parallel to each other.

In some embodiments, first electrodes corresponding to each of the plurality of liquid crystal grating periods are arranged equidistantly, and second electrodes corresponding to each of the plurality of liquid crystal grating periods are arranged equidistantly.

In some embodiments, a distance between two adjacent ones of the first electrodes corresponding to each of the plurality of liquid crystal grating periods is less than 1 μm, and a distance between two adjacent ones of the second electrodes corresponding to each of the plurality of liquid crystal grating periods is less than 1 μm.

In some embodiments, orthographic projections of the plurality of light-shielding regions on the backlight module cover the light extraction gratings.

In some embodiments, one of the plurality of liquid crystal grating periods is provided with one to six of the plurality of first electrodes.

In some embodiments, the liquid crystal layer comprises a nematic liquid crystal.

In some embodiments, a thickness of the liquid crystal layer ranges from 0.1 µm to 10 µm.

In some embodiments, the backlight module comprises a monochrome light source on a light entering surface of the light guide plate, wherein the monochrome light source is configured to emit light to be coupled into the light guide plate via the light entering surface.

In some embodiments, the display panel further comprises a planarization layer between the backlight module and the liquid crystal layer.

According to another embodiment of the present disclosure, there is provided a display device, comprising the display panel as described in any of the embodiments of the present disclosure.

BRIEF DESCRIPTION OF THE DRAWINGS

The aforementioned and/or additional embodiments and advantages of the present application will become apparent and easily understood from the following description of the embodiments in conjunction with the accompanying drawings, in which.

DETAILED DESCRIPTION

Figure 1:
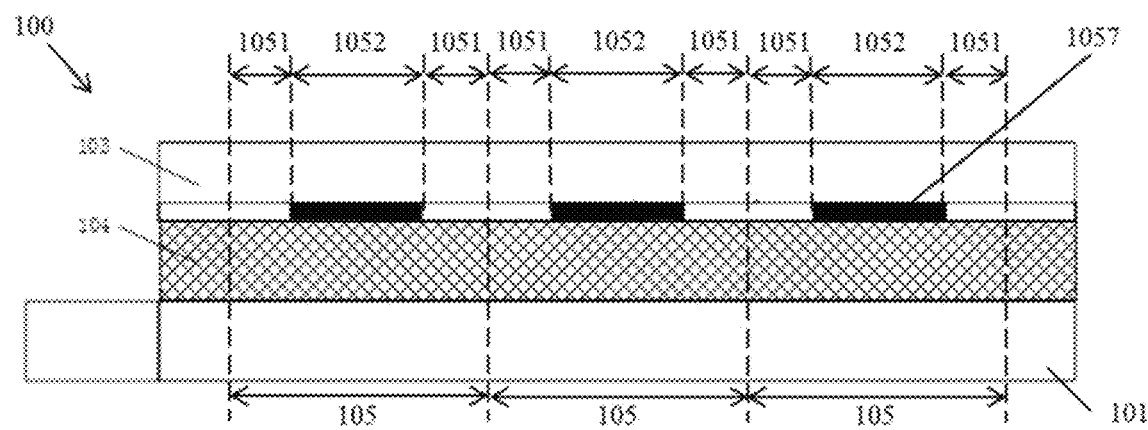
FIG. 1 schematically illustrates a cross-sectional view of a display panel according to an embodiment of the present disclosure.

The present application is described in detail below. Examples of embodiments of the present application are shown in the drawings, in which the same or similar reference numerals indicate throughout the same or similar components or the components having the same or similar functions. The embodiments described below with reference to the drawings are exemplary and are only used to explain the present application, and cannot be construed as limiting of the present application.

Those skilled in the art can understand that, unless otherwise defined, all terms (including technical terms and scientific terms) used herein have the same meaning as commonly understood by those of ordinary skill in the art to which this application pertains. It should also be understood that the meanings of the terms used in this application should be interpreted with reference to the meanings in the context.

Those skilled in the art can understand that, unless specifically stated otherwise, the singular form words such as "a", "an", "said" and "the" may include a meaning of plurality. It should be further understood that the wordings "including" and "comprising" used in the specification of this application are opening transition words and do not exclude the presence of one or more other features, steps, operations, elements, components, and/or combination thereof that are not explicitly recited. It should be understood that the term "connected" means that a plurality of elements defined by the term may be connected together directly or indirectly (for example, there are other elements between these elements), and may also include wirelessly connection. The wording "and/or" as used herein includes all or any one or any combination of the elements associated with the term items.

An LCD panel generally uses a lower polarizer to polarize the light emitted from a backlight module, and then use a liquid crystal layer to modulate the light that has been polarized for the first time, and then use a color filter to filter the modulated light such that only a specific color of light can pass through, and finally uses an upper polarizer to cooperate with the lower polarizer, thereby achieving a basic display function.

The upper polarizer, the lower polarizer, the color filter, and even the array substrate will affect the light output efficiency of the LCD. As a result, the light output efficiency of common LCD panels is low. This restricts the application of the LCD in some special scenarios such as transparent display.

Currently, some LCD panels no longer require the polarizers. In such an LCD panel, a light exiting portion of the backlight module is aligned with a light-shielding region of a pixel. When the pixel is not required to emit light, the light emitted from the backlight module will directly impinge on a light-shielding strip of the light-shielding region in the pixel. When the pixel is required to emit light, the liquid crystal layer can be formed as a liquid crystal grating to diffract the light emitted from the backlight module, so that the traveling direction of the light originally impinging on the light-shielding strip is changed such that the light now impinges on a light-transmitting region, thereby exiting from the display panel. However, due to the process limitations, especially the design of the electrodes for the liquid crystal layer, the conventional liquid crystal grating has a limited diffractive ability, with the maximum angle of the diffraction being 21.4 degrees. For example, in a conventional LCD panel, the two electrode layers for the liquid crystal layer are a common electrode layer of an integrated layer structure and a layer of pixel electrodes separated from each other. The liquid crystal grating driven by electric fields formed by such electrodes can only diffract a small part of the light to make it emitted from the light-transmitting region. Most of the light is still shielded by the light-shielding strip in the light-shielding region. The main efficiency of the diffracted light is concentrated on the 0-th order and the ±1st order. The diffraction efficiency is currently only 15%, resulting in a low light output efficiency.

The present disclosure provides a display panel. FIG. 1 schematically illustrates a cross-sectional view of a display panel according to an embodiment of the present disclosure. As shown in FIG. 1, the display panel 100 includes a base substrate 103 and a plurality of light-shielding strips 1057 arranged on the base substrate. The light-shielding strips define light-shielding regions 1052 on the base substrate 103. The light-transmitting regions 1051 are arranged beside the light-shielding regions. It can be understood that the display panel 100 includes a plurality of pixel units 105 arranged in an array. Each of the pixel units contains a segment of the light-shielding strip. If the direction in which the light-shielding strips extend is defined as the row direction, and the direction perpendicular to the row direction is defined as the column direction, then both sides of the light-shielding region along the column direction are arranged with light-transmitting regions. Therefore, each pixel unit 105 includes a light-shielding region 1052 in the middle and light-transmitting regions on both sides of the light-shielding region 1052. In other embodiments, the light-transmitting region 1051 may surround the periphery of the light-shielding region 1052. The display panel 100 further includes a backlight module 101 and a combination of a first electrode layer, a second electrode layer, and a liquid crystal layer controlled by the first electrode layer and the second electrode layer, which is located between the backlight module 101 and the base substrate 103. For convenience of description, the combination may also be referred to, for short, as a diffractive element 104. The diffractive element is located at the optical downstream of the backlight module. The term "optical downstream" means that the diffractive element 104 is configured to receive the light from the backlight module 101.

Figure 2:
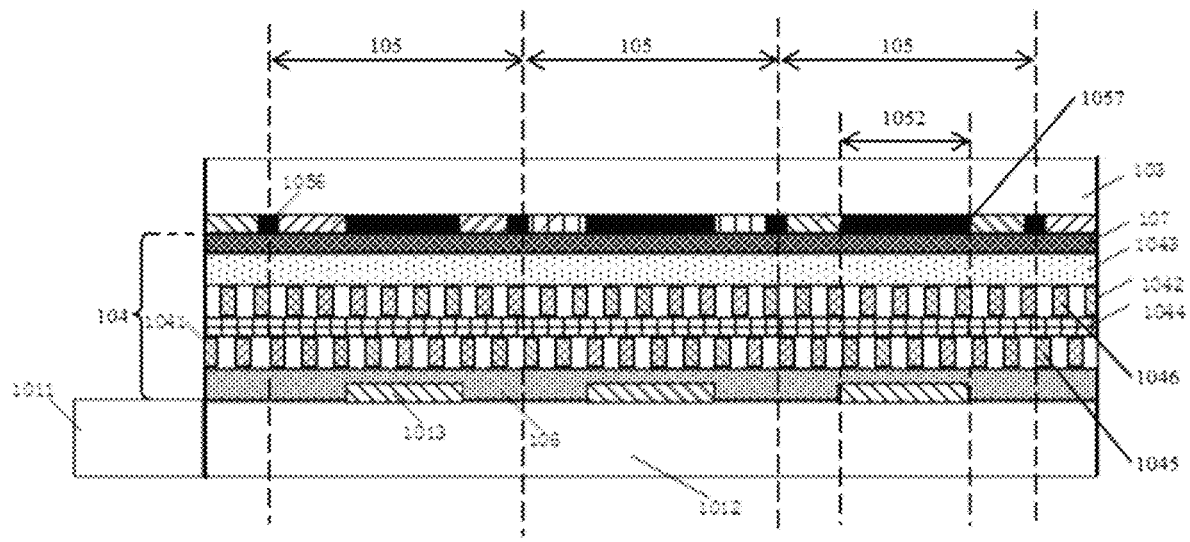
FIG. 2 schematically illustrates a specific structure of the display panel of FIG. 1.

FIG. 2 schematically illustrates a specific structure of the display panel of FIG. 1. The backlight module 101 includes a light guide plate 1012 and a light extraction grating 1013. The light extraction grating 1013 is configured to couple out the light in the light guide plate 1012 and to further collimate the light. The light-shielding region 1052 includes a light-shielding strip 1057. The light-shielding strip 1057 is strip-shaped, and can block the coupled-out and collimated light when no control signal is applied to the liquid crystal layer. The light extraction grating 1013 collimates the coupled-out light such that it travels in a direction perpendicular to the light-shielding strip 1057, so that the coupled-out and collimated light will impinge on the light-shielding strip 1057 when no control signal is applied to the first electrodes and the second electrodes. In this moment, the pixel unit 105 is displayed in black.

As shown in FIG. 2, the display panel may include a first electrode layer 1041, a second electrode layer 1042 and a liquid crystal layer 1043 that are located between the base substrate and the light guide plate. The first electrode layer 1041 includes a plurality of first electrodes 1045 spaced apart from each other. The second electrode layer 1042 includes a plurality of second electrodes 1046 spaced apart from each other. The display panel further includes a controller that generates a control signal. The first electrode layer 1041 and the second electrode layer 1042 are configured to jointly control the liquid crystal layer 1043 in response to the control signal at the same time, so that the liquid crystal layer 1043 forms a plurality of liquid crystal grating periods. The liquid crystal within each of the liquid crystal grating periods includes a plurality of liquid crystal segments (referred to as segments for short) with different refractive indices. Each of the segments has an individual refractive index. The refractive index of each segment depends on the parameters of the electric field in which the segment is located, and the parameters of the electric field are determined by the control signal applied to the first electrode and the second electrode forming the electric field. In the present application, a "corresponding relationship" exists between the liquid crystal grating period, the liquid crystal segments and the electrodes, which indicates that the refractive index of the liquid crystal segments can be controlled by the electrodes, and that these liquid crystal segments form the liquid crystal grating period. Both the first electrodes 1045 of the first electrode layer 1041 and the second electrodes 1046 of the second electrode layer 1042 of the present disclosure are arranged in a spaced manner, so that the voltages of the first electrodes and the second electrodes can be controlled by a controller, in order to control the refractive indices of individual liquid crystal segments, such that the refractive indices of the segments within a single liquid crystal grating period progressively increase in a direction perpendicular to the extending direction of the first electrodes. In this way, the optical effect of the liquid crystal grating is equivalent to the optical effect of a blazed grating, which allows the light from the backlight module 101 to be diffracted by the diffractive element at a larger diffraction angle (for example, greater than 21.4°) and exit from the light-transmitting region 1051.

Figure 3:
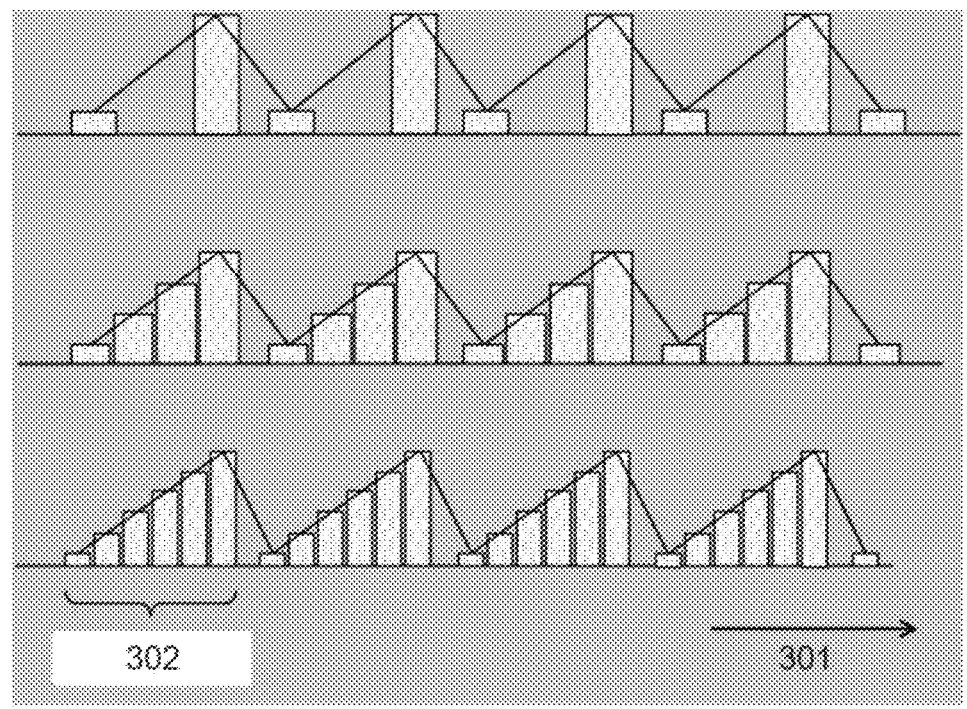
FIG. 3 schematically illustrates a refractive index distribution of a liquid crystal layer in a display panel according to an embodiment of the present disclosure.

FIG. 3 schematically illustrates a refractive index distribution in several liquid crystal grating periods of a section of the liquid crystal layer. The arrow direction 301 in FIG. 3 indicates the direction perpendicular to the extending direction of the first electrodes 1045. As shown in FIG. 3, within a single liquid crystal grating period 302, the refractive indices of the liquid crystal segments progressively increase in the direction perpendicular to the extending direction of the first electrodes. Since the liquid crystal layer has a substantially consistent thickness throughout, the change tendency of the refractive indices is equivalent to the change tendency of the optical path differences. That is, within one liquid crystal grating period, the optical path differences progressively increase along the direction perpendicular to the extending direction of the first electrodes. Such an optical path difference attribute of the liquid crystal grating of the present disclosure is substantially consistent with the optical path difference attribute of a blazed grating, enabling an optical effect substantially consistent with that of the blazed grating, thereby deflecting the light incident on the liquid crystal layer at a larger diffraction angle. Two to six liquid crystal segments can be included within one liquid crystal grating period. Since a first electrode can control 1 to 2 liquid crystal segments, a liquid crystal grating period corresponds to 1 to 6 first electrodes.

Figure 4:
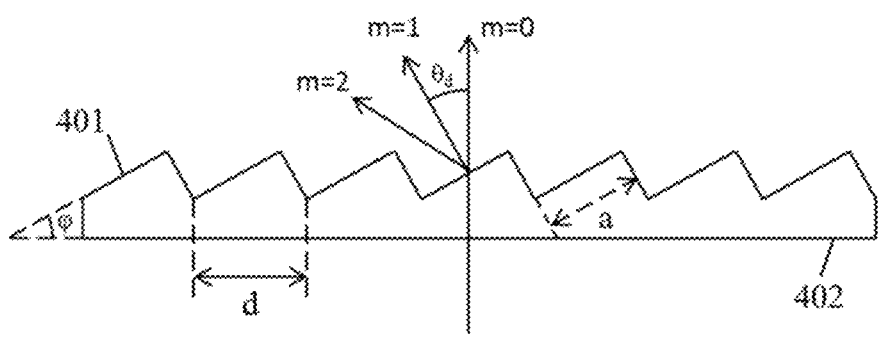
FIG. 4 schematically illustrates a light path diagram of a blazed grating structure.

FIG. 4 schematically illustrates a diffraction light path diagram of a transmissive blazed grating. The optical path difference Δ is the optical path difference between the center and the edge of a single slit aperture in the diffraction direction, which satisfies the following equation:

$$\Delta = m\lambda = d \times [\sin(\theta_d) - \sin(\theta_i)]$$

where d is the grating period, $\theta_d$ is the diffraction angle, and $\theta_i$ is the incidence angle. When light is incident in a direction perpendicular to the grating surface 401, the above equation can be transformed into:

$$\Delta = m\lambda = 2d \times \sin\varphi$$

where φ is the blaze angle. According to this equation, the blaze wavelength λ can be obtained. The progressive increase of the refractive indices of the liquid crystal segments within a liquid crystal grating period of the present application can be understood as an increase in the thickness of the segments with the refractive indices remain unchanged, as is the case in a blazed grating. Therefore, the liquid crystal layer in the display panel of the present disclosure can achieve an optical effect similar to that of a blazed grating under the control of the first electrode layer and the second electrode layer. The blaze angle φ of the blazed grating reflects a change tendency of the refractive indices. The larger the blaze angle φ, the larger the change rate of the refractive indices of the liquid crystal segments. By designing the liquid crystal grating period d and the blaze angle φ, the light output efficiency can be greatly increased.

The facet surface and the grating surface of the blazed grating are not parallel, with an angle (the blaze angle φ) formed therebetween, which separates the central primary maximum of the diffraction of a single facet surface 401 from the zero-order primary maximum of the interference of the individual facet surfaces, and transfers and concentrates the light energy from the zero-order primary maximum of the interference to a certain order of spectrum, thus realizing the blaze of this order of spectrum. The width a of the facet surface 401 of the blazed grating is approximately equal to the width d (i.e., the period) of the grating surface 402. The spectra of other orders of the wavelength λ almost all coincide with the position of the minimums of the diffraction of a single facet surface 401, such that these orders of spectra have very small intensities. In general, the blazed spectra account for more than 90% of the total light energy.

Since the liquid crystal layer 1043 is composed of many discrete liquid crystal molecules, a continuous change in the phase of light cannot be achieved when adjusting the phase of the light. Therefore, only phase changes of multiple stages as a step-shape can be applied to the light in order to gradually approach a continuous distribution of the phase of the blazed grating. As shown in FIG. 3, each period of the liquid crystal grating is divided into n stages, producing a grating of multi-stage (step) phase profile. Adjacent steps will produce a phase difference of 2Pi/n, realizing a phase modulation such as a binary step grating to the incident light. Pi is the circumference ratio, and can also be represented by the Greek letter π. It is a mathematical constant that ubiquitously exists in mathematics and physics. One period may contain two, four, six or even more steps.

If the refractive indices of the liquid crystal segments within each liquid crystal grating period increase in a same direction, as shown in FIG. 4, the light emitted from the backlight module is deflected in the same direction after passing through these liquid crystal grating periods. It can be understood that the light emitted from the backlight module will be deflected toward the other side of the grating surface normal if the refractive indices of the liquid crystal segments are arranged to increase in the opposite direction. For pixels in which the light-shielding region is arranged between two light-transmitting regions, in order to make the light emitted by the backlight module exit from both sides of the light-shielding strip, the refractive indices of the liquid crystal segments in a part of the liquid crystal grating periods may be arranged in the way shown in FIG. 4, and the refractive indices of the liquid crystal segments in another part of the liquid crystal grating periods may be arranged in an opposite increasing direction.

In the display panel 100 of the embodiment of the present application, the diffractive element 104 can adjust the propagation direction of the light emitted from the backlight module 101. The amount of the light exiting the pixels can be controlled by controlling the diffraction angle of the light, thereby achieving grayscale display. When no voltage is applied to the diffractive element 104, the light exiting from and collimated through the light extraction grating 1013 of the backlight module 101 impinges on the light-shielding strip 1057 and is absorbed. In this case, no light exits from the pixel, and the pixel is displayed in a dark state. When certain voltages are applied to the first electrode layer 1401 and the second electrode layer 1402 of the diffractive element 104, the refractive indices throughout the liquid crystal layer 1043 are adjusted to equivalently form the morphology of a blazed grating. The liquid crystal layer 1043 adjusts the phase of the collimated light, enabling an adjustment of the propagation direction of the light emitted from the backlight module 101. The diffractive element of the present disclosure can diffract the light at a larger diffraction angle, so that more light exits from the light-transmitting regions 1051 without being shielded in the light-shielding regions 1052, thus achieving a technical effect of greatly increasing the light output efficiency.

The structure of the diffractive element is described in more detail below. As shown in FIG. 2, the diffractive element 104 includes the first electrode layer 1041, the second electrode layer 1042, and the liquid crystal layer 1043. The first electrode layer 1041 includes first electrodes 1045 arranged periodically. The second electrode layer includes second electrodes 1046 arranged periodically. In some embodiments, both the first electrode layer 1042 and the second electrode layer 1043 are disposed on a base substrate. In other embodiments, both the first electrode layer 1042 and the second electrode layer 1043 are disposed on the light guide plate (i.e., on the backlight module). The first electrode layer 1041 and the second electrode layer 1042 are configured to form electric fields to rotate the liquid crystal molecules in the liquid crystal layer 1043, thereby adjusting the refractive indices throughout the liquid crystal layer 1043 to form a liquid crystal grating having the effect of a blazed grating. Within each liquid crystal grating period, the first electrodes 1045 may be arranged at equal intervals, and the second electrodes 1046 may also be arranged at equal intervals. The distance between the two closest first electrodes 1045, each of which is respectively from one of two adjacent liquid crystal grating periods, is not necessarily equal to the distance between the first electrodes 1045 within a single liquid crystal grating period. Likewise, the distance between the two closest second electrodes 1046, each of which is respectively from one of the two adjacent liquid crystal grating periods is not necessarily equal to the distance between the second electrodes 1046 within a single liquid crystal grating period.

In some embodiments, the liquid crystal layer 1043 may be a nematic liquid crystal or other liquid crystals. The liquid crystal layer 1043 may have a thickness of 0.1 μm to 10 μm, and is used to form a liquid crystal grating under the driving of the first electrode layer 1041 and the second electrode layer 1042.

By diffracting or refracting the incident light, the propagation direction of the incident light is changed, such that the light originally impinged on the light-shielding strips 1057 will now exit from the light-transmitting regions 1051. The light exiting from the light-transmitting regions 1051 has a larger light energy, in order to achieves a technical effect of greatly increasing the light output efficiency.

In some embodiments, as shown in FIG. 2, the first electrode layer 1041 and the second electrode layer 1042 are located on the same side of the liquid crystal layer 1043. The first electrode layer 1041 and the second electrode 1042 are electrically insulated from each other. The orthographic projections of the first electrodes 1045 on the backlight module 101 do not overlap with the orthographic projections of the second electrodes 1046 on the backlight module 101. If the base substrate 103 is used as a reference, the orthographic projections of the first electrodes 1045 on the base substrate 103 do not overlap with the orthographic projections of the second electrodes 1046 on the base substrate 103. The first electrode layer 1041 and the second electrode layer 1042 can be electrically insulated by an insulating layer 1044. In a specific embodiment, the first electrode layer 1041 and the second electrode layer 1042 may be located on a side of the liquid crystal layer 1043 close to the backlight module 101. Voltage signals are applied to the first electrodes 1045 and the second electrodes 1046 to form electric fields. In this embodiment, the first electrodes 1045 and the second electrodes 1046 are interlaced, that is, the orthographic projections of the first electrodes 1045 on the backlight module 101 do not overlap with the orthographic projections of the second electrodes 1046 on the backlight module 101. The resulting electric fields are horizontal electric fields. Through the electric fields, the refractive indices throughout the liquid crystal layer 1043 can be changed, enabling the liquid crystal layer 1043 to achieve the effect of a blazed grating.

Figure 5:
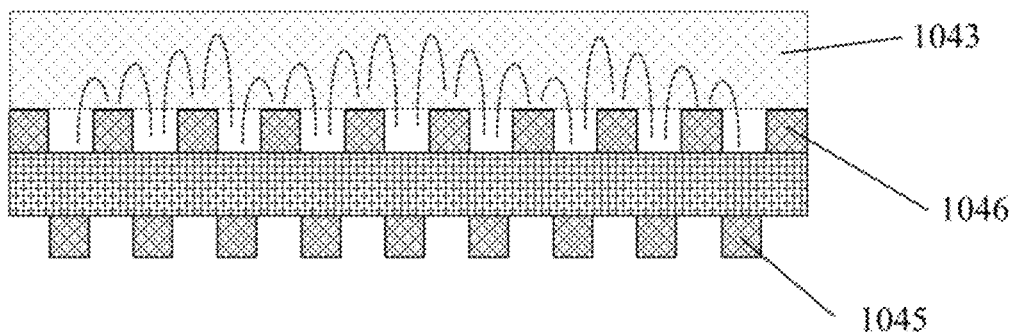
FIG. 5 schematically illustrates an electric field distribution of a diffractive element of the display panel of FIG. 2.

FIG. 5 schematically illustrates an electric field distribution of the display panel of FIG. 2 in a display operation. By using the controller to individually supply power to the first electrodes 1045 and the second electrodes 1046, the electric fields formed in the liquid crystal layer can be controlled such that the liquid crystal layer exhibits a plurality of liquid crystal grating periods, and each of the liquid crystal grating periods includes a plurality of segments with different refractive indices, and the refractive indices of these segments progressively increase in a direction perpendicular to the extending direction of the first electrodes. Specifically, since the intensity of the electric field determines the refractive index of the liquid crystal segment, and the intensity of the electric field depends on the voltage of the electrodes forming the electric field, therefore, the refractive indices of the liquid crystal segments can be adjusted by controlling the voltages of the first electrodes and the second electrodes by means of the controller. For example, the first electrode layer and the second electrode layer in FIG. 5 are arranged on the same side of the liquid crystal layer, and the orthographic projections of the first and second electrodes on the backlight module do not overlap with each other. For ease of description, in an example in which one liquid crystal grating period corresponds to M first and second electrodes (i.e., the total quantity of the first electrodes and the second electrodes is M), the M first and second electrodes form M orthographic projections on the backlight module. Within one liquid crystal grating period, as shown by the dotted line in FIG. 5, a second electrode 1046 form different electric fields with the first electrodes 1045 on its both sides, and a first electrode 1045 form different electric fields with the second electrode 1046 on its both sides, with the intensities of the electric fields within one period increasing in the direction perpendicular to the extending direction of the first electrodes. To this end, the voltages of the first electrodes and second electrodes may be set such that, within the liquid crystal grating period, in the direction perpendicular to the extending direction of the first electrodes, the voltage difference between the first one of the first electrodes and the first one of the second electrodes is less than the voltage difference between the first one of the second electrodes and the second one of the first electrodes, and the voltage difference between the first one of the second electrodes and the second one of the first electrodes is less than the voltage difference between the second one of the first electrodes and the second one of the second electrodes, and so on in a similar manner. In other words, among the M orthographic projections of the M first and second electrodes on the backlight module, in response to the control signal, the voltage difference between the electrode to which an (n−1)-th one of the orthographic projections corresponds and the electrode to which an n-th one of the orthographic projections corresponds is smaller than the voltage difference between the electrode to which the n-th one of the orthographic projections corresponds and the electrode to which an (n+1)-th one of the orthographic projections corresponds, where M is a positive integer greater than or equal to 3, n is a positive integer greater than or equal to 2, and M is greater than n. By means of the above control of the controller, the liquid crystal layer can be formed as a liquid crystal blazed grating.

In the above embodiment, one first electrode may form different and asymmetric electric fields with two adjacent second electrodes, respectively, so that the refractive indices of the liquid crystal segments in these two electric fields can be controlled independently. In this arrangement of electrodes, each first electrode 1045 corresponds to two liquid crystal segments. However, for the conventional arrangement of a layer of a block-shaped common electrode and another layer of strip-shaped electrodes separated from each other, the electric fields on both sides of each strip-shaped electrode are symmetrical, so the refractive indices of the liquid crystal segments formed by these two electric fields are the same and cannot progressively increase in the direction perpendicular to the extending direction of the first electrodes, making it impossible to form the liquid crystal grating as described in this disclosure.

Figure 6:
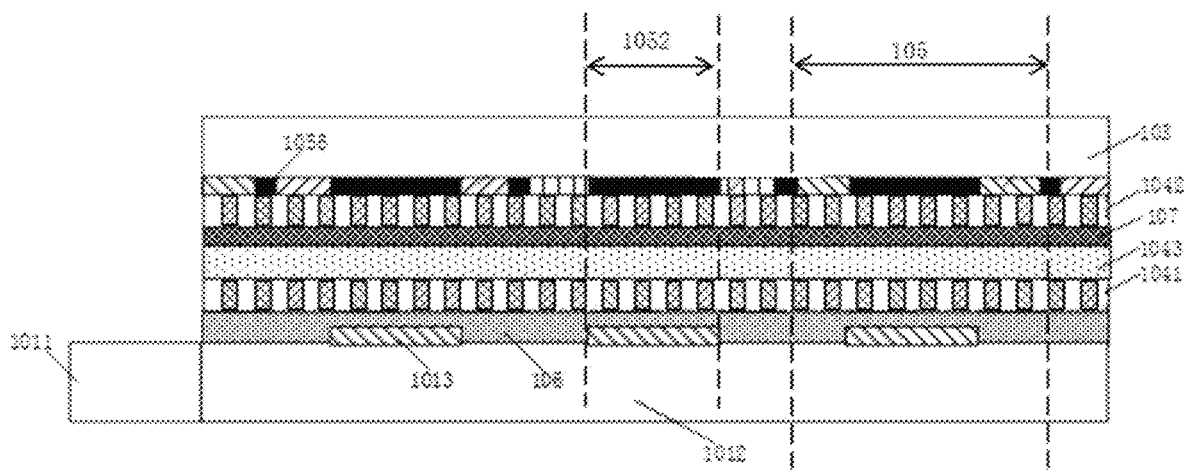
FIG. 6 schematically illustrates another specific structure of the display panel of FIG. 1.

FIG. 6 schematically illustrates a cross-sectional view of a display panel according to another embodiment of the present disclosure. As shown in FIG. 6, the first electrode layer 1041 and the second electrode layer 1042 are located on different sides of the liquid crystal layer 1043. That is, the liquid crystal layer 1043 is located between the first electrode layer 1041 and the second electrode layer 1042. In some embodiments, the first electrode layer 1041 may be located on the backlight module and the second electrode layer 1042 may be located on the base substrate 103. In other embodiments, the first electrode layer 1041 may be located on the base substrate and the second electrode layer 1042 may be located on the backlight module. The first electrodes 1045 and the second electrodes 1046 are aligned, that is, the orthographic projections of the first electrodes 1045 on the backlight module 101 overlap with the orthographic projections of the second electrodes 1046 on the backlight module 101. Voltage signals are applied to the first electrodes 1045 and the second electrodes 1046 to form electric fields. The first electrodes 1045 and the second electrodes 1045 are aligned and the electric fields formed are vertical electric fields. The electric fields change the refractive indices throughout the liquid crystal layer 1043, allowing the liquid crystal layer 1043 to achieve the effect of a blazed grating.

Figure 7:
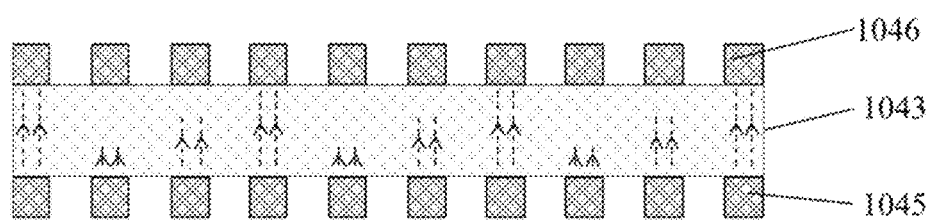
FIG. 7 schematically illustrates an electric field distribution of a diffractive element of the display panel of FIG. 6.

FIG. 7 schematically illustrates an electric field distribution of the display panel of FIG. 6 in a display operation.

As shown in FIG. 7, the electric fields are distributed vertically. In this arrangement of electrodes, each first electrode 1045 corresponds to one liquid crystal segment. The refractive indices of the liquid crystal segments can be controlled independently, and the refractive indices of adjacent liquid crystal segments can be different, enabling the liquid crystal layer to realize a refractive index distribution as a blazed grating, thereby achieving a large diffraction angle of the blazed grating. The arrow direction in FIG. 7 indicates the direction of the electric fields, and the lengths of the dotted lines represent the intensities of the electric fields. For the convenience of description, the first electrode 1045 and the second electrode 1046 whose projections coincide with each other are called a pair of electrodes. In order to form the electric fields shown in FIG. 7, every pair of electrodes within a liquid crystal grating period can be powered by a controller. For example, by the control of the controller, in the direction perpendicular to the extending direction of the first electrodes, the voltage difference of the first pair of electrodes is smaller than the voltage difference of the second pair of electrodes, and the voltage difference of the second pair of electrodes is smaller than the voltage difference of the third pair of electrodes, and so on. This way, the voltage differences of the electrode pairs progressively increase in the direction perpendicular to the extending direction of the first electrodes. In other words, if a liquid crystal grating period includes J first electrodes, then among the J first electrodes, in response to the control signal, the voltage difference between a k-th one of the first electrodes and the second electrode corresponding thereto is smaller than the voltage difference between a (k+1)-th one of the first electrodes and the second electrode corresponding thereto, where J is a positive integer greater than or equal to 2, k is a positive integer greater than or equal to 1, and J is greater than k. With the above arrangement, the voltage differences of the electrodes progressively increase, thereby achieving an increase in the refractive indices within the liquid crystal grating period.

In certain exemplary embodiments, the first electrodes 1041 and the second electrodes 1042 are strip-shaped electrodes parallel to each other.

In certain exemplary embodiments, the distance between two adjacent first electrodes 1041, especially the first electrodes within a liquid crystal grating period, may be less than 1 μm. In certain exemplary embodiments, the distance between two adjacent second electrodes 1042, especially the second electrodes within a liquid crystal grating period, may be less than 1 μm. By making the distance between two adjacent first electrodes 1041 or second electrodes 1042 as small as possible (for example, less than 1 μm), the liquid crystal layer 1043 can be controlled more finely, allowing the liquid crystal layer 1043 to better realize the effect of a blazed grating.

In some embodiments, the backlight module 101 further includes a monochromatic light source 1011. The monochromatic light source 1011 is located on a light entering surface of the light guide plate 1012. The light extraction gratings 1013 are located on a light exiting surface of the light guide plate 1012. The light extraction grating 1013 is used for extracting the light incident into the light guide plate 1012 from the monochromatic light source 1011 out of the light guide plate 1012 at a collimated angle. Since the blazed grating has a light-splitting function, the monochromatic light source is employed in some embodiments in order to better control the diffraction angle. In some embodiments, the monochromatic light source may be a blue light source.

The light emitted from the monochromatic light source 1011 is coupled into the light guide plate 1012 via the light entering surface of the light guide plate 1012 at different incidence angles. The light coupled into the light guide plate 1012 travels in the light guide plate 1012 via total reflection. The light extraction gratings 1013 located on the light exiting surface of the light guide plate 1012 extract the light from the monochromatic light source 1011 in the light guide plate 1012 at a collimated angle.

The monochrome light source 1011 provided in the embodiment of the present application may be a light-emitting diode (LED), a micro light-emitting diode (Micro LED) chip formed by a transfer method, or an organic light-emitting diode (OLED) chip. The Micro LED has higher brightness, better luminous efficiency and lower power consumption than the OLED. Since the blazed grating has a light-splitting effect, the display panel of the present disclosure employs a monochromatic light source to better control the diffraction direction.

In certain exemplary embodiments, the structure of the monochromatic light source 1011 may include a light directing device, such as a lens, a parabolic reflector, a bevel reflector, and the like. The light directing device converges the divergent light and couples it into the light guide plate 1012 at a small divergence angle, for example, couples the light into the light guide plate 1012 at a small range of incidence angles greater than the total reflection angle.

Figure 8:
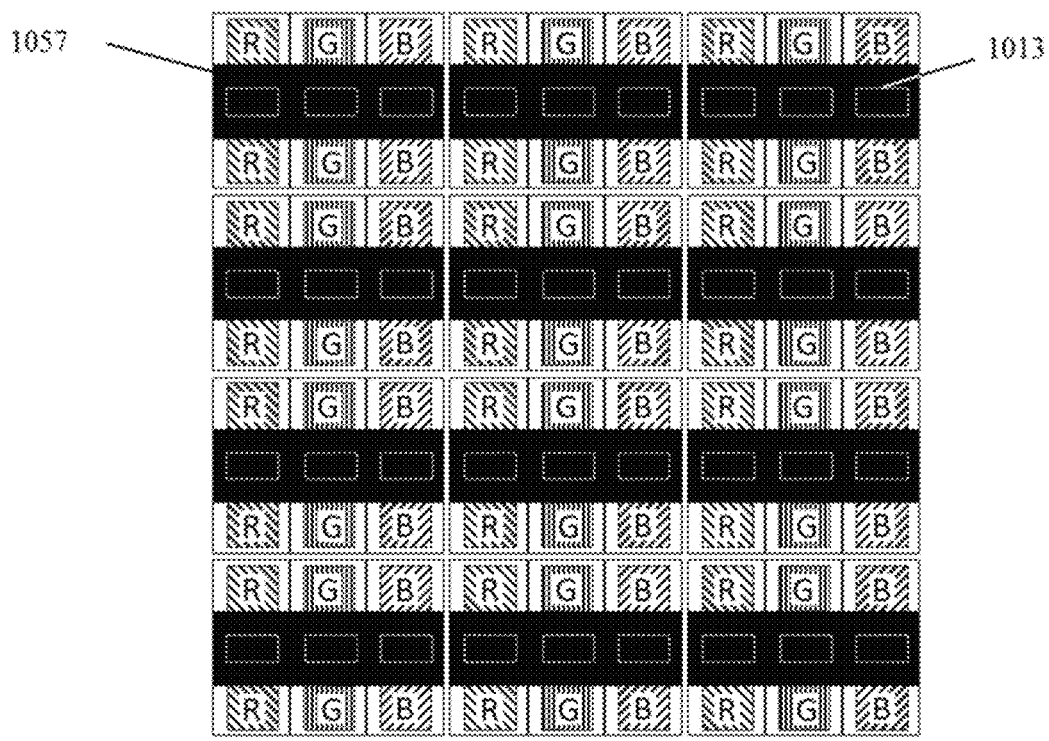
FIG. 8 schematically illustrates a top view of a display panel according to an embodiment of the present disclosure.

FIG. 8 schematically illustrates a top view of a display panel according to an embodiment of the present disclosure. The light-shielding strips are arranged horizontally and, in some embodiments, span multiple sub-pixels (as shown in FIG. 8) or even across multiple pixels. The light extraction grating 1013 is indicated by a white dotted block in FIG. 8. Each sub-pixel has an individual light extraction grating. The orthographic projection of the light-shielding region 1052 on the backlight module 101 covers the light extraction grating 1013. In other words, the orthographic projection of the light extraction grating 1013 on the base substrate 103 overlaps with the orthographic projection of the light-shielding region 1052 on the base substrate 103. The light extraction grating 1013 may be located on an upper surface of the light guide plate 1012 (i.e., the side of the light guide plate 1012 facing the liquid crystal layer 1043), or on a lower surface of the light guide plate 1012 (i.e., the side of the light guide plate 1012 facing away from the liquid crystal layer 1043). When the light extraction grating 1013 is located on the upper surface of the light guide plate 1012, the light extraction grating 1013 directly couples the light imping thereon in the light guide plate 1012 out of the light guide plate 1012. When the light extraction grating 1013 is located on the lower surface of the light guide plate 1012, the light extraction grating 1013 reflects the light impinging thereon in the light guide plate 1012, and couples it out of the light guide plate 1012 through the upper surface. When the light extraction grating 1013 is located on the upper surface of the light guide plate 1012, the optical path of the light before reaching the base substrate 103 is small. Therefore, in order to further improve the light extraction efficiency, the light extraction gratings 1013 may be specifically disposed on the upper surface of the light guide plate 1012.

When the light extraction grating 1013 is disposed on the upper surface of the light guide plate 1012, the display device further includes a planarization layer 106 disposed on the light extraction grating 1013. The planarization layer 106 may flatten a side of the backlight module 101 facing the diffractive element 104. The planarization layer 106 may include a low refractive index material. The thickness of the planarization layer 106 may be greater than or equal to 1 μm, in order to better planarize the light extraction grating 1013. When the thickness of the planarization layer 106 is greater than or equal to 1 μm, the planarization can be realized more easily.

In certain exemplary embodiments, the display device in the embodiment of the present application further includes alignment layers 107 on both sides of the liquid crystal layer 1043. FIGS. 2 and 6 only show the alignment layer 107 located above the liquid crystal layer 1043. The alignment layer 107 is configured to set a pre-tilt angle of the liquid crystal molecules in the liquid crystal layer 1043. For brevity, the specific setting method of the alignment layer 107 is not described here.

In some embodiments, the light-transmitting region 1051 includes a quantum dot material. For example, the light-transmitting region 1051 may include a red quantum dot material region, a green quantum dot material region, and a blue quantum dot material region. An interference prevention region 1056 is provided between adjacent quantum dot material regions to prevent the light emitted by the backlight module in one pixel unit from impinging on an adjacent quantum dot material region, which causes a cross-color phenomenon. The quantum dot material around the light-shielding region 1052 is the same kind of quantum dot material. The quantum dot materials around adjacent light-shielding regions 1052 have different colors.

The light generated by the monochromatic light source 1011 excites the quantum dots in the red quantum dot material region, the green quantum dot material region, and the blue quantum dot material region to realize colorful display. At the same time, the quantum dot materials have good scattering properties, enabling the scattering of the collimated light emitted from the red quantum dot material region, the green quantum dot material region, and the blue quantum dot material region, thus increasing the viewing angle.

In the display device provided in the embodiment of the present application, by applying certain voltage signals to the first electrodes 1045 and the second electrodes 1046 to generate horizontal or vertical electric fields, the liquid crystal of the liquid crystal layer 1043 can be rotated to adjust the refractive indices throughout the liquid crystal layer in order to equivalently form the effect of a blazed grating, thereby achieving the technical effect of greatly increasing the light output efficiency.

Figure 9:
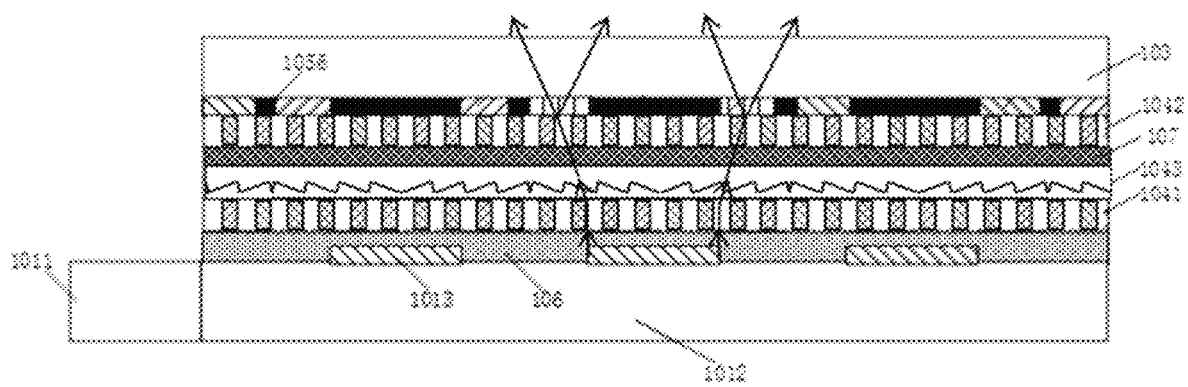
FIG. 9 schematically illustrates a light path diagram inside a display panel according to an embodiment of the present disclosure.

FIG. 9 schematically illustrates a light path diagram inside a display panel according to an embodiment of the present disclosure. As shown in FIG. 9, based on the display panel shown in FIG. 6, by controlling the voltages of the first electrodes 1045 and the second electrodes 1046, different electric fields are applied throughout the liquid crystal layer 1043, causing changes in the phases throughout the liquid crystal layer 1043 to form a liquid crystal blazed grating. The liquid crystal blazed grating refers in a broad sense to a liquid crystal grating structure capable of realizing the optical effect of a conventional blazed grating. The liquid crystal blazed grating diffracts the collimated light incident from the light extraction gratings 1013, changes the propagation direction of the light, and emits the blazed spectra that account for 90% of the total energy from the red quantum dot material region, the green quantum dot material region and the blue quantum dot material region, achieving the technical effect of greatly increasing the light output efficiency. As shown in FIG. 9, in order to make the light exit from the light-transmitting regions on both sides of the light-shielding strip, the liquid crystal grating periods of the liquid crystal layer corresponding to one pixel unit may include two opposite increasing directions of the refractive indices. For example, the refractive indices of the liquid crystal grating periods in the left half of the pixel unit may progressively decrease from left to right, and the refractive indices of the liquid crystal grating periods in the right half may progressively increase from left to right, rendering the collimated light to be deflected in different directions. This can be adjusted by controlling the voltages of the first electrodes and the second electrodes.

It should be noted that the principle of diffracting the light based on the display panel of FIG. 2 is the same as that described above, and is not repeated here.

According to another embodiment of the present disclosure, a display device is provided. The display device includes a display panel according to an embodiment of the present disclosure. The liquid crystal layer of the display device provided in the embodiment of the present application can exhibit optical properties such as those of a blazed grating when a pixel needs to perform display, and adjust the propagation direction of the light emitted from the backlight module, such that grayscale display can be achieved when the light exit from the light-transmitting regions of the pixel unit. When no voltage is applied to the diffractive element, the collimated light exiting from the light exiting surface of the backlight module impinges on the light-shielding strip of the light-shielding region and is absorbed. No light is emitted from the pixel, and the pixel is displayed in a dark state. When certain voltage signals are applied to the diffractive element, the refractive indices throughout the liquid crystal layer are changed to form a phase structure similar to a blazed grating. Through the diffraction of the incident collimated light by the liquid crystal grating, the propagation direction of the light emitted from the backlight module can be adjusted such that the diffraction angle could be at a larger angle and then exits from the light-transmitting regions, thus achieving the technical effect of greatly increasing the light output efficiency.

In the description of this application, it should be understood that the orientation or positional relationship indicated by the terms such as "center", "upper", "lower", "front", "back", "left", "right", "vertical", "horizontal", "top", "bottom", "inside", "outside", etc. is based on the orientation or positional relationship shown in the drawings, and is only for the convenience of describing the present disclosure and the simplicity of the description, rather than indicate or imply that the related apparatus or element must have a specific orientation, or be constructed and operate in a specific orientation, and therefore cannot be understood as limiting of the present disclosure.

The terms "first" and "second" etc. are used for purposes of naming only, and cannot be understood as indicating or implying relative importance or implicitly indicating the number of the related technical features. Thus, the features defined as "first" and "second" may explicitly or implicitly include one or more of the features. In the description of the present disclosure, unless otherwise stated, "a plurality of", "multiple" and "several" mean two or more.

In the description of this specification, specific features, structures, materials, or characteristics may be combined in a suitable manner in any one or more embodiments or examples.

The foregoing is only a part of the embodiments of the present application. It should be noted that, for those of ordinary skill in the art, several improvements and modifications can be made without departing from the principles of the present application. These improvements and modifications should be regarded as falling within the protection scope of this application.

What is claimed is:
1. A display panel, comprising:
a base substrate and a plurality of light-shielding strips on the base substrate, wherein the base substrate comprises a plurality of light-shielding regions defined by the plurality of light-shielding strips and light-transmitting regions beside the plurality of light-shielding regions, a backlight module comprising a light guide plate and light extraction gratings, wherein the light extraction gratings are configured to couple out light in the light guide plate, and a first electrode layer, a second electrode layer, and a liquid crystal layer between the base substrate and the light guide plate, wherein the first electrode layer comprises a plurality of first electrodes spaced apart from each other, and the second electrode layer comprises a plurality of second electrodes spaced apart from each other;

wherein the first electrode layer and the second electrode layer are configured to control the liquid crystal layer in response to a control signal, such that the liquid crystal layer forms a plurality of liquid crystal grating periods, wherein a liquid crystal within each of the plurality of liquid crystal grating periods comprises a plurality of segments with different refractive indices, and the refractive indices of the plurality of segments progressively increase in a direction perpendicular to an extending direction of the plurality of first electrodes, and wherein orthographic projections of the plurality of light-shielding regions on the backlight module substantially fully cover the light extraction gratings in a plan view.

2. The display panel of claim 1, wherein the first electrode layer and the second electrode layer are at a same side of the liquid crystal layer and are electrically insulated, orthographic projections of the plurality of first electrodes on the backlight module do not overlap with orthographic projections of the plurality of second electrodes on the backlight module, and each of the plurality of first electrodes is configured to control the refractive indices of two of the plurality of segments.

3. The display panel of claim 2, wherein one of the plurality of liquid crystal grating periods corresponds to M electrodes comprising multiple ones of the plurality of first electrodes and multiple ones of the plurality of second electrodes, the M electrodes form a plurality of M orthographic projections on the backlight module, the multiple ones of the plurality of first electrodes and the multiple ones of the plurality of second electrodes are in different layers, and orthographic projections of the multiple ones of the plurality of first electrodes on the backlight module do not overlap with orthographic projections of the multiple ones of the plurality of second electrodes on the backlight module, wherein, in response to the control signal, among the M electrodes, a voltage difference between an electrode corresponding to an $(n-1)^{th}$ one of the M orthographic projections and an electrode corresponding to an $n^{th}$ one of the M orthographic projections is smaller than a voltage difference between the electrode corresponding to the $n^{th}$ of the M orthographic projections and an electrode corresponding to an $(n+1)^{th}$ one of the M orthographic projections, wherein M is a positive integer greater than or equal to 3, n is a positive integer greater than or equal to 2, and M is greater than n.

4. The display panel of claim 2, wherein both of the first electrode layer and the second electrode layer are formed on a side of the liquid crystal layer closer to the base substrate, or both of the first electrode layer and the second electrode layer are formed on a side of the liquid crystal layer closer to the backlight module.

5. The display panel of claim 2, wherein the first electrodes and the second electrodes are strip-shaped electrodes parallel to each other.

6. The display panel of claim 5, wherein first electrodes corresponding to each of the plurality of liquid crystal grating periods are arranged equidistantly, and second electrodes corresponding to each of the plurality of liquid crystal grating periods are arranged equidistantly.

7. The display panel of claim 6, wherein a distance between two adjacent ones of the first electrodes corresponding to each of the plurality of liquid crystal grating periods is less than 1 μm, and a distance between two adjacent ones of the second electrodes corresponding to each of the plurality of liquid crystal grating periods is less than 1 μm.

8. The display panel of claim 1, wherein the first electrode layer and the second electrode layer are on different sides of the liquid crystal layer, an orthographic projection of each of the plurality of first electrodes on the backlight module overlaps with an orthographic projection of a corresponding one of the plurality of second electrodes on the backlight module, and each of the plurality of first electrodes is configured to control the refractive index of a corresponding one of the plurality of segments.

9. The display panel of claim 8, wherein one of the plurality of liquid crystal grating periods corresponds to J ones of the plurality of first electrodes, and in response to the control signal, a voltage difference between a $k^{th}$ one of the J ones of the plurality of first electrodes and a second electrode corresponding to the $k^{th}$ one of the J ones of the plurality of first electrodes is smaller than a voltage difference between a $(k+1)^{th}$ one of the J ones of the plurality of first electrodes and a second electrode corresponding to the $(k+1)^{th}$ one of the J ones of the plurality of first electrodes, wherein J is a positive integer greater than or equal to 2, k is a positive integer greater than or equal to 1, and J is greater than k.

10. The display panel of claim 8, wherein the first electrode layer is formed on a side of the liquid crystal layer closer to the base substrate and the second electrode layer is formed on a side of the liquid crystal layer closer to the backlight module, or the second electrode layer is formed on a side of the liquid crystal layer closer to the base substrate and the first electrode layer is formed on a side of the liquid crystal layer closer to the backlight module.

11. The display panel of claim 8, wherein the first electrodes and the second electrodes are strip-shaped electrodes parallel to each other.

12. The display panel of claim 11, wherein first electrodes corresponding to each of the plurality of liquid crystal grating periods are arranged equidistantly, and second electrodes corresponding to each of the plurality of liquid crystal grating periods are arranged equidistantly.

13. The display panel of claim 12, wherein a distance between two adjacent ones of the first electrodes corresponding to each of the plurality of liquid crystal grating periods is less than 1 μm, and a distance between two adjacent ones of the second electrodes corresponding to each of the plurality of liquid crystal grating periods is less than 1 μm.

14. The display panel of claim 1, wherein one of the plurality of liquid crystal grating periods is provided with one to six of the plurality of first electrodes.

15. The display panel of claim 1, wherein the liquid crystal layer comprises a nematic liquid crystal.

16. The display panel of claim 1, wherein a thickness of the liquid crystal layer ranges from 0.1 μm to 10 μm.

17. The display panel of claim 1, wherein the backlight module comprises a monochrome light source on a light entering surface of the light guide plate, wherein the monochrome light source is configured to emit light to be coupled into the light guide plate via the light entering surface.

18. The display panel of claim 1, further comprising a planarization layer between the backlight module and the liquid crystal layer.

19. A display device, comprising the display panel according to claim 1.

* * * * *